United States Patent [19]

Marling et al.

[11] 4,257,860
[45] Mar. 24, 1981

[54] DEUTERIUM ENRICHMENT BY SELECTIVE PHOTOINDUCED DISSOCIATION OF A MULTIHALOGENATED ORGANIC COMPOUND

[75] Inventors: John B. Marling, Livermore; Irving P. Herman, Oakland, both of Calif.

[73] Assignee: The United States of America as represented by the United States Department of Energy, Washington, D.C.

[21] Appl. No.: 943,833

[22] Filed: Sep. 19, 1978

[51] Int. Cl.$^3$ .................. B01D 59/00; B01D 59/34
[52] U.S. Cl. .................. 204/162 R; 204/DIG. 11
[58] Field of Search .................. 204/157.1 R, 158 R, 204/162 R, 163 HE, 163 R, DIG. 11

[56] References Cited

U.S. PATENT DOCUMENTS

| | | | |
|---|---|---|---|
| 3,904,500 | 9/1975 | Jensen | 204/162 R |
| 3,947,335 | 3/1976 | Marling | 204/158 R |
| 3,983,020 | 9/1976 | Moore et al. | 204/157.1 R |
| 4,025,408 | 5/1977 | Marling | 204/163 R |
| 4,049,515 | 9/1977 | Robinson et al. | 204/157.1 R |
| 4,081,339 | 3/1978 | Benson | 204/158 R |

OTHER PUBLICATIONS

Fettweis, P. et al., J. App. Phys., 49 (12): 5699–5702, Dec. 1978.
Hackett, P. A. et al. J. Chem. Phys., 69(6): 2924–2925, Sep. 15, 1978.
Colussi, A. J. et al., Chem. Phys. Lett. 52(2): 349–354, Dec. 1, 1977.

Primary Examiner—Richard E. Schafer
Attorney, Agent, or Firm—P. Martin Simpson, Jr.; Roger S. Gaither; Richard G. Besha

[57] ABSTRACT

A method for deuterium enrichment by photoinduced dissociation which uses as the deuterium source a multihalogenated organic compound selected from the group consisting of a dihalomethane, a trihalomethane, a 1,2-dihaloethene, a trihaloethene, a tetrahaloethane and a pentahaloethane. The multihalogenated organic compound is subjected to intense infrared radiation at a preselected wavelength to selectively excite and thereby induce dissociation of substantially only those molecules containing deuterium to provide a deuterium enriched dissociation product. The deuterium enriched product may be combusted with oxygen to provide deuterium enriched water. The deuterium depleted undissociated molecules may be redeuterated by treatment with a deuterium source such as water.

28 Claims, 1 Drawing Figure

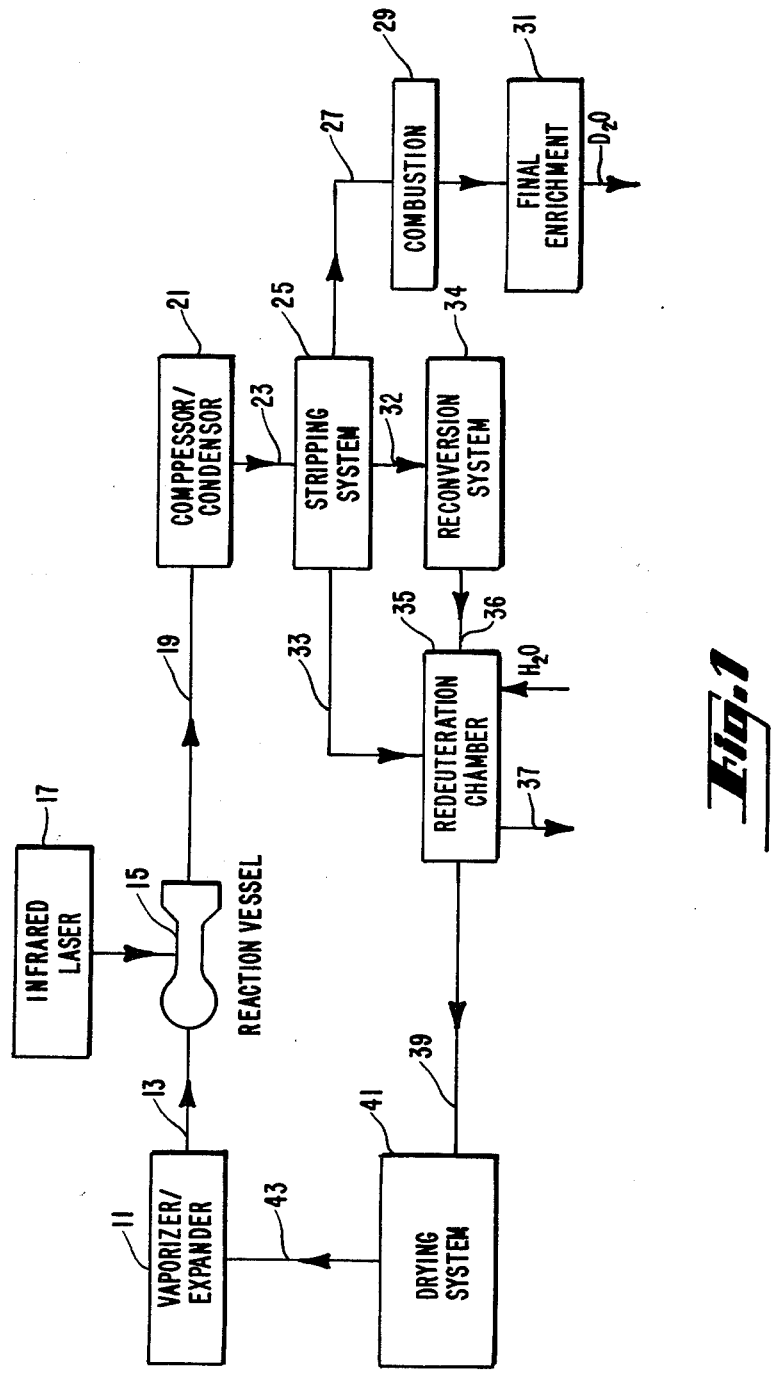

DEUTERIUM ENRICHMENT BY SELECTIVE PHOTOINDUCED DISSOCIATION OF A MULTIHALOGENATED ORGANIC COMPOUND

BACKGROUND OF THE INVENTION

The invention described herein was made at the Lawrence Livermore Laboratory in the course of or under U.S. Department of Energy Contract No. W-7405-ENG-48 with the University of California.

This invention relates to a method for producing a deuterium enriched material. More particularly, this invention relates to a method for deuterium enrichment by selective photoinduced dissociation.

Deuterium is currently largely obtained from Canada. The process by which deuterium is currently produced in Canada involves deuterium exchange between water and hydrogen sulfide. The high toxicity of hydrogen sulfide and the relatively high price of the heavy water produced are disadvantages of this hydrogen sulfide technology. The need exists for a deuterium separation process which permits the production of heavy water significantly below the cost of process currently in use and which does not involve toxic or dangerous reactants or reaction products.

Recently, various processes for deuterium enrichment based on selective photoinduced dissociation by laser have been proposed. For example, it has been proposed to use formaldehyde or glyoxal as the working gas in such a process. More recently, it has been proposed to use a class of organic compounds of the formula RX in which R is selected from the ethyl, isopropyl, t-butyl, or cyclopentenyl groups and X is a group such as F, Cl, Br or OH. Selective photodissociation yields a deuterium containing olefin specie and HX. This process is described in Benson, U.S. Pat. No. 4,081,339, Mar. 28, 1978.

To be practical for large scale production, the working gas used (1) should be capable of being redeuterated relatively easily, (2) should provide a dissociation product which does not exchange hydrogen or deuterium with the working gas, (3) should be volatile, relatively nontoxic and nonflammable, and (4) should provide highly selective absorption of the deuterated species in the infrared range, particularly the range available with a high power $CO_2$ laser (9.2–10.8 $\mu$m).

Of the working gases previously proposed, formaldehyde and glyoxal do not redeuterate easily with water, and except for ethyl fluoride-1-$d_1$, the naturally occurring monodeuterated species of ethyl halide, isopropyl halide, and t-butyl halide do not have highly deuterium selective absorption accessible by a $CO_2$ laser.

SUMMARY OF THE INVENTION

The present invention utilizes as the deuterium source a multihalogenated organic compound selected from the group consisting of a dihalomethane, a trihalomethane, a 1,2-dihaloethene, a trihaloethene, a tetrahaloethane, and a pentahaloethane wherein the halogen substituents may be the same or different. The preferred materials for use in the present invention are fluorodichloromethane; 2,2-dichloro-1,1,1-trifluoroethane; 2-chloro-1,1,1-trifluoroethane; 2-bromo-1,1,1-trifluoroethane; cis-1,2-dichloroethene; cis-1,2-dichloro-1-fluoroethene; diiodomethane; trichloroethene; and tribromoethene. With these preferred compounds highly isotopically selective absorption of the naturally occurring monodeuterated species is accessible with a high power $CO_2$ laser, and all of these compounds can be relatively easily redeuterated by liquid phase hydrogen/deuterium exchange with water tied to a water feedstream.

Of the foregoing compounds, 2,2-dichloro-1,1,1-trifluoroethane ($CF_3CHCl_2$) is the most preferred. This compound is superior in all respects, since it has the fastest base-catalyzed aqueous phase H/D exchange rate of the preferred compounds, is extremely resistant to hydrolysis, has very highly deuterium selective absorption accessible by $CO_2$ laser in two bands near 10.2 $\mu$m and 10.6 $\mu$m, dissociates with high yield into a deuterium bearing product, trifluoroethene, which does not lose its deuterium by exchange with either the working gas, the walls, or any moisture that may be present. Furthermore, it is volatile (b.p. +28.7° C.), is relatively nonflammable, and has low toxicity. An additional advantage occurs during aqueous-phase redeuteration, where a favorable H/D exchange equilibrium causes a slight deuterium enrichment ($\alpha = 1.1$–$1.3$) to occur in the dichlorotrifluoroethane to yield a working gas with slightly greater than natural abundance (>140 ppm) deuterium content.

It is, therefore, an object of this invention to provide a method for the production of a deuterium enriched material.

More particularly, it is an object of this invention to provide a method for deuterium enrichment by selective photoinduced dissociation.

Another object of this invention is to provide a method for deuterium enrichment wherein the deuterium depleted working material is relatively easily redeuterated for reuse by simple liquid phase H/D exchange and/or which makes use of an efficient $CO_2$ laser.

Other objects and advantages will become apparent from the following detailed description made with reference to the accompanying drawing.

BRIEF DESCRIPTION OF THE DRAWING

FIG. 1 is a block diagram illustrating a particular embodiment of the present invention.

DETAILED DESCRIPTION OF THE INVENTION

Broadly, the deuterium enrichment process of the present invention utilizes as the deuterium source certain multihalogenated organic compounds, specifically, dihalomethanes, trihalomethanes, 1,2-dihaloethenes, trihaloethenes, tetrahaloethanes, or pentahaloethanes. It has been found that these compounds have available highly selective absorption of the naturally occurring monodeuterated species in the range of a high power $CO_2$ laser and/or are readily redeuterated by liquid phase hydrogen/deuterium exchange with water.

In accordance with the present invention, the deuterium containing multihalogenated organic compound is irradiated with infrared radiation at a preselected wavelength and of sufficient intensity to selectively excite and induce dissociation of substantially only those molecules containing deuterium. A deuterium enriched dissociation product and at least one other dissociation product are formed; the nonexcited molecules remain substantially undissociated. The multihalogenated organic compound deuterium source thus becomes depleted in deuterium. The deuterium enriched dissociation product, after separation from other dissociation product(s) and deuterium depleted multihalogenated organic compound, may be reacted with oxygen to provide deuterium enriched water. The deuterium depleted multihalogenated organic compound product may be redeuterated for reuse by treatment with a deuterium source, for example, by base-catalyzed liquid phase hydrogen/deuterium exchange with normal water, that is, water containing deuterium in natural isotopic abundance at a ph in the range of about 10–14.

The preferred compounds for use in the present invention are fluorodichloromethane ($CHCl_2F$); 2,2-dichloro-1,1,1-trifluoroethane ($CF_3CHCl_2$); 2-chloro-1,1,1-trifluoroethane ($CF_3CH_2Cl$); 2-bromo-1,1,1-trifluoroethane ($CF_3CH_2Br$); cis-1,2-dichloroethene (CHCl=CHCl); cis-1,2-dichloro-1-fluoroethene (CFCl=CHCl); diiodomethane ($CH_2I_2$); trichloroethene ($CCl_2$=CHCl); and tribromoethene ($CBr_2$=CHBr). These compounds are both relatively easily redeuterated in the aqueous phase and accessible by $CO_2$ laser for selective excitation and dissociation of the monodeuterated species. However, the compounds 2-chloro-1,1,1-trifluoroethane ($CF_3CH_2Cl$) and 2-bromo-1,1,1-trifluoroethane ($CF_3CH_2Br$) are preferentially redeuterated in an alkyl alcohol such as t-butanol using the corresponding alkali alkoxide, e.g., potassium t-butoxide at about 1 M (1 M=1 mole/liter), as catalyst to promote more rapid H/D exchange. The alkali alkoxide catalyst concentration range typically lies between about $10^{-4}$ M to about 1 M. The alkyl alcohol itself is redeuterated nearly instantaneously by liquid phase exchange with normal water. The approximate wavelength for selective absorption by the monodeuterated species and the H/D exchange rates for the preferred compounds are given in Table I.

The following compounds, which are also useful in the present process, are also relatively easily redeuterated by aqueous phase H/D exchange, but are not within the range of standard $CO_2$ lasers: chloroform ($CHCl_3$); 2,2-dibromo-1,1,1-trifluoroethane ($CF_3CHBr_2$); 2-bromo-2-chloro-1,1,1-trifluoroethane ($CF_3CHBrCl$); bromoform ($CHBr_3$); fluorodibromomethane ($CHBr_2F$); bromodichloromethane ($CHBrCl_2$), chlorodibromomethane ($CHBr_2Cl$), and 2-iodo-1,1,1-trifluoroethane ($CF_3CH_2I$). Infrared lasers are available for use with members of this group of compounds, for example, the isotopic $C^{18}O_2$ laser near 9.0 $\mu$m, the isotopic $^{13}CO_2$ laser for 11.0–11.3 $\mu$m, the $CS_2$ laser for 11.3–11.7 $\mu$m, and the rotational HF laser for 14.2 $\mu$m. The pertinent properties of this group of compounds are given in Table II.

TABLE II

| OTHER MOLECULES FOR IR LASER SEPARATION OF DEUTERIUM | | | |
|---|---|---|---|
| Compound | Selective Absorption by Monodeuterated Species | H/D Exchange Rate Liters mole$^{-1}$·sec$^{-1}$ | Boiling Point |
| Chloroform ($CHCl_3$) | 11.0$\mu$m | 0.2 at 20° C. | 62° C. |
| $CF_3CHBr_2$ | 8.96$\mu$m | $3.8 \times 10^{-2}$ at 0° C. | 72° C. |
| $CF_3CHBrCl$ | 11.02$\mu$m | $2.2 \times 10^{-2}$ at 0° C. | 50° C. |
| Bromoform ($CHBr_3$) | 11.58$\mu$m, 11.80$\mu$m | 1.1 at 0° C. | 150° C. |
| $CHBr_2F$ | 14.20$\mu$m | 1.1 at 20° C. | 64° C. |
| $CHBrCl_2$ | 11.0$\mu$m, 11.4$\mu$m | $5 \times 10^{-2}$ at 0° C. | 90° C. |
| $CHBr_2Cl$ | 11.26$\mu$m, 11.72$\mu$m | 0.2 at 0° C. | 119° C. |
| $CF_3CH_2I$ | 11.1$\mu$m | Exchanges in basic solution | 55° C. |

Another group of compounds which are suitable for use in the present invention include: chlorodifluoromethane ($CHClF_2$); trifluoromethane ($CHF_3$); difluoromethane ($CH_2F_2$); cis-1,2-difluoroethene (CFH=CFH); trans-1,2-difluoroethene (CFH=CFH); and trifluoroethene ($CF_2$=CHF). These compounds are also within the range of $CO_2$ lasers but are not as easily redeuterated by aqueous phase H/D exchange as the compounds listed in Tables I and II. The pertinent spectral properties of this group of compounds are given in Table III.

TABLE III

| OTHER MOLECULES WITHIN THE RANGE OF $CO_2$ LASERS | |
|---|---|
| Compound | Selective Absorption by Monodeuterated species |
| $CHClF_2$ | 947 cm$^{-1}$, 1013 cm$^{-1}$ |
| $CHF_3$ | 970 cm$^{-1}$ |
| $CH_2F_2$ | 954 and 966 cm$^{-1}$ (calc.) |
| Cis-1,2-difluoroethene | 10.8$\mu$m |
| Trans-1,2-difluoroethene | 10.5$\mu$m |
| Trifluoroethene | 977 cm$^{-1}$ (10.2$\mu$m) |

TABLE I

| REFERRED MOLECULES FOR IR LASER SEPARATION OF DEUTERIUM | | | |
|---|---|---|---|
| Compound | Selective Absorption by Monodeuterated Species | H/D Exchange Rate Liters mole$^{-1}$·sec$^{-1}$ | Boiling Point |
| $CF_3CH_2Cl$ | 937cm$^{-1}$ (10.67$\mu$m) | Exchanges readily in t-Butanol with potassium t-Butoxide catalyst | 7° C. |
| $CHCl_2F$ | 947cm$^{-1}$ (10.56$\mu$m) | $3.9 \times 10^{-3}$ at 20° C. | 9° C. |
| $CF_3CH_2Br$ | 914cm$^{-1}$ (10.94$\mu$m) | Exchanges readily in t-Butanol with potassium t-Butoxide catalyst | 26° C. |
| $CF_3CHCl_2$ | 985 and 941 cm$^{-1}$ | 0.14 at 20° C. | 29° C. |
| Cis-1,2-dichloro-1-fluoroethene | 1009 cm$^{-1}$ | Exchanges in basic solution | 31° C. |
| Cis-1,2-dichloroethene | 952 and 962 cm$^{-1}$ | Exchanges in basic solution | 60° C. |
| Trichloroethene | 1013 cm$^{-1}$ (9.87$\mu$m) | Exchanges k~$10^{-4}$ at 85° C. | 87° C. |
| Tribromoethene | 953 cm$^{-1}$ (10.49$\mu$m) | Exchanges in basic solution | 163° C. |
| Diiodomethane ($CH_2I_2$) | 1078 cm$^{-1}$ (9.27$\mu$m) | Exchanges readily in basic solution | 181° C. |

Photodissociation of the deuterium containing molecules of the present multihalogenated organic compounds leads to the formation of either a deuterium enriched hydrogen halide photoproduct or a deuterium enriched unsaturated hydrocarbon photoproduct, depending on the particular compound used. The following reaction sequences are illustrative of specific embodiments of the process of the present invention. In the first case, a halomethane is used as the working material, and in the second case a haloethane is used.

A. Fluorodichloromethane

Selective dissociation:

$$CDCl_2F + h\nu(10.6\ \mu m) \rightarrow CClF + DCl \qquad (1)$$

Formation of deuterium enriched water:

$$4DCl + O_2 \rightarrow 2D_2O + 2Cl_2 \qquad (2)$$

Redeuteration of depleted species:

$$HDO + CHCl_2F \xrightarrow{OH^-} CDCl_2F + H_2O \qquad (3)$$

CClF radicals recombine to form 1,2-dichlorodifluoroethene.

B. Trifluorodichloroethane

Selective dissociation:

$$CF_3CDCl_2 + h\nu(10.6\ \mu m) \rightarrow CF_2=CFD + 2Cl \qquad (4)$$

Formation of deuterium enriched water:

$$4CF_2=CFD + O_2 \rightarrow 2D_2O + \text{other combustion products} \qquad (5)$$

Redeuteration of depleted species:

$$HDO + CF_3CHCl_2 \xrightarrow{OH^-} CF_3CDCl_2 + H_2O \qquad (6)$$

The Cl radicals react to form HCl and trifluorotrichloroethane, using the parent compound as a chlorine atom scavenger. Other radical scavengers, such as alkanes, may also be used.

The process of the present invention is hereinafter described in greater detail with reference to FIG. 1 which is a block flow diagram of a particular embodiment of the invention.

A multihalogenated organic compound as above-described and containing a monodeuterated species in natural isotopic abundance is vaporized and expanded as a gas in chamber 11 and admitted via line 13 into reaction vessel 15. The gas is subjected to high intensity infrared radiation by a pulsed laser 17 at a preselected wavelength which will selectively excite and dissociate substantially only the deuterium containing molecules. The laser is preferably operated with an energy fluence near 10 joules/cm² and a pulse width of less than 100 nanoseconds in duration for proper enrichment. An energy fluence less than about 1 J/cm² will provide negligible dissociation yield, whereas an energy fluence near 100 J/cm² causes a drastically reduced deuterium enrichment factor due to unwanted dissociation of the nondeuterated species.

The resulting gaseous mixture of deuterium enriched dissociation product, deuterium depleted multihalogenated organic compound, and other dissociation products is introduced via line 19 into chamber 21 where the gases are compressed and liquefied. The compressed mixture is then introduced via line 23 into a stripping chamber 25 where the deuterium enriched dissociation product is separated from the deuterium depleted multihalogenated organic compound and other decomposition products. The deuterium enriched photoproduct is admitted by means of line 27 into combustion chamber 29 where it is reacted with oxygen to produce a deuterium enriched water (H₂O/HDO/D₂O) which is sent to enrichment stage 31 for final enrichment to D₂O by conventional means such as fractional distillation. Secondary dissociation products are removed from the stripping chamber 25 via line 32 where they can be either discarded or reconverted in chamber 34 into the working material and admitted to the redeuteration chamber via line 36.

The deuterium depleted working material is introduced via line 33 into redeuteration chamber 35 where it is contacted with water, with added base if necessary, for aqueous phase H/D exchange. Depleted water is removed via line 37. The redeuterated working material is removed by means of line 39 and introduced into chamber 41 to be dried. The dried, redeuterated halogenated organic compound is then introduced by means of line 43 into chamber 11 for vaporization and expansion and reuse.

The following examples are illustrative of the process of the present invention.

EXAMPLE I

In a laboratory investigation, 2,2-dichloro-1,1,1-trifluoroethane (known by the trade name Freon-123) was used as the deuterium source. Room temperature gas samples of CF₃CHCl₂ containing 0.5% CF₃CDCl₂ were irradiated by a pulsed CO₂ TEA laser near 10.7 μm using the P(26) line. A weak focus (f=75-250 cm, 0.5-2 joules per pulse) was used to irradiate cells containing 0.1-10 torr of the Freon-123 gas mixture with a small number (2-40) of pulses. Laser irradiation yielded CF₂=CFD as the major product, in which the deuterium is protected from loss by subsequent H/D exchange. Depending on irradiation conditions, a photoproduct containing 50-85% CF₂=CFD was obtained, corresponding to a single step deuterium enrichment factor of 200-1400 fold. Optimum enrichment was obtained with f=250 cm and 2 joules per pulse, corresponding to an energy fluence of about 4 J/cm². CF₂=CFD yield was increased by adding a secondary gas for scavenging atomic and molecular radicals through addition of such a scavenger as small amounts of a hydrocarbon, such as a light alkane (propane, isobutane). The operating pressure was increased by addition of a secondary gas, which was an inert buffer gas.

EXAMPLE II

Considering a typical large scale operation, 2,2-dichloro-1,1,1-trifluoroethane containing deuterium near natural isotopic abundance (140-160 ppm CF₃CDCl₂) is vaporized, mixed with secondary gases as needed, expanded as a gas mixture and admitted to an irradiation cell reaction chamber at a total pressure near 100 torr. The secondary gas may be needed to increase the single-step deuterium enrichment factor and/or the yield of deuterium enriched trifluoroethene. The gas is subjected to a single pulse of high intensity CO₂ laser radiation near 10.6 μm with an energy fluence near 10 joules/cm² and a pulse width of about one nanosecond in duration. The selectively excited deuterium bearing molecules preferentially dissociate to yield $CF_2=CFD$ as the major product, providing a singlestep deuterium enrichment factor in excess of 1000-fold.

The resulting gaseous mixture of deuterium enriched trifluoroethene, deuterium depleted dichlorotrifluoroethane, secondary gases, and other decomposition products is then compressed and liquefied. The deuterium enriched trifluoroethene is separated from the deuterium depleted dichlorotrifluoroethane by bubbling nitrogen gas through the liquid cooled to about $-100°$ C. The separated deuterium enriched trifluoroethene is combusted to provide deuterium enriched water which is subsequently enriched by fractional distillation to a final purity of about 99.7% $D_2O$.

The deuterium depleted dichlorotrifluoroethane is then contacted with an excess of water at natural isotopic abundance containing sodium hydroxide as a catalyst and agitated. H/D exchange occurs rapidly at room temperature under these conditions ($k_{exch} \approx 0.14$ mole.-liter $^{-1}$sec$^{-1}$ at 20° C.) and the hydrolysis is negligible ($<10^{-4}$ of exchange rate). Methanol may be added to improve the solubility of dichlorotrifluoroethane. A slight deuterium enrichment, $\alpha=1.1-1.3$, in the dichlorotrifluoroethane occurs during exchange because of a favorable deuterium/hydrogen equilibrium ratio to yield dichlorotrifluoroethane containing 150–160 ppm $CF_3CDCl_2$. The liquid dichlorotrifluoroethane is separated from the water/sodium hydroxide mixture (and methanol, if used), dried to remove residual water, and returned for reuse.

Thus, it has been shown that the present invention provides a method for deuterium enrichment by selective photodissociation wherein the depleted working material is relatively easily redeuterated for reuse by liquid phase H/D exchange using inexhaustible supplies of water as the deuterium source, and/or wherein an efficient high power $CO_2$ laser is used to separate the deuterated species.

While specific examples and a specific operational sequence for carrying out the invention have been described, modifications and changes will become apparent to those skilled in the art, and it is intended to cover in the appended claims all such modifications and changes as come within the spirit and scope of the invention.

What we claim is:

1. A method for deuterium enrichment which comprises:
providing a gas phase source of deuterium, said source being a multihalogenated organic compound selected from the group consisting of a dihalomethane, a trihalomethane, a 1,2-dihaloethene, a trihaloethene, a tetrahaloethane, and a pentahaloethane;
subjecting said multihalogenated organic compound to infrared radiation with a pulse duration in the range of about one to about thirty nanoseconds at a preselected wavelength and of sufficient intensity to selectively excite and induce dissociation of those molecules containing deuterium to form a deuterium enriched dissociation product and a deuterium depleted undissociated multihalogenated organic compound product; and
separating the deuterium enriched dissociation product from the deuterium depleted undissociated multihalogenated organic compound product.

2. The method according to claim 1 wherein the infrared radiation is provided by a $CO_2$ laser.

3. The method according to claim 1 wherein the deuterium enriched dissociation product is reacted with oxygen to produce deuterium enriched water.

4. The method according to claim 1 wherein the deuterium depleted undissociated multihalogenated organic compound product is redeuterated for reuse by treatment with a deuterium containing source.

5. The method according to claim 4 wherein the deuterium containing source is water containing deuterium in natural isotopic abundance.

6. The method according to claim 5 wherein the water contains an added base as catalyst to increase the rate of redeuteration.

7. The method according to claim 4 wherein the deuterium containing source is an alkyl alcohol in the presence of the corresponding alkali alkoxide as catalyst in the concentration range between about $10^{-4}$ to about 1 M.

8. The method according to claim 7 wherein the alkyl alcohol is redeuterated by treatment with water containing deuterium in natural isotopic abundance.

9. The method according to claim 7 wherein the alkyl alcohol is t-butanol.

10. The method according to claim 1 wherein said multihalogenated organic compound is selected from the group consisting of fluorodichloromethane; 2,2-dichloro-1,1,1-trifluoroethane; 2-chloro-1,1,1-trifluoroethane; 2-bromo-1,1,1-trifluoroethane; cis-1,2-dichloroethene; cis-1,2-dichloro-1-fluoroethene; diiodomethane; trichloroethene; and tribromoethene.

11. The method according to claim 10 wherein said multihalogenated organic compound is 2,2-dichloro-1,1,1-trifluoroethane and the deuterium enriched dissociation product is deuterium enriched trifluoroethane.

12. The method according to claim 11 wherein the yield of deuterium enriched trifluoroethene is increased by addition of at least one secondary gas.

13. The method according to claim 12 wherein the secondary gas is an inert buffer gas.

14. The method according to claim 12 wherein the secondary gas is an atomic and molecular radical scavenger.

15. The method according to claim 14 wherein the atomic and molecular radical scavenger is a hydrocarbon.

16. The method according to claim 11 wherein the single-step deuterium enrichment factor is increased by addition of at least one secondary gas.

17. The method according to claim 16 wherein the secondary gas is an inert buffer gas.

18. The method according to claim 16 wherein the secondary gas is an atomic and molecular radical scavenger.

19. The method according to claim 18 wherein the atomic and molecular radical scavenger is a hydrocarbon.

20. The method according to claim 11 wherein the infrared radiation is provided by a $CO_2$ laser.

21. The method according to claim 20 wherein the $CO_2$ laser is operated at an energy fluence of about 10 joules/cm$^2$.

22. The method according to claim 1, wherein said multihalogenated organic compound is selected from the group consisting of bromodichloromethane, tribromomethane, trichloromethane, chlorodibromomethane, fluorodibromomethane, 2,2-dibromo-1,1,1-trifluoroethane, 2-bromo-2-chloro-1,1,1-trifluoroethane, and 2-iodo-1,1,1-trifluoroethane.

23. The method according to claim 1, wherein said multihalogenated organic compound is selected from the group consisting of chlorodifluoromethane, cis-1,2-difluoroethene, trans-1,2-difluoroethene, difluoromethane, trifluoroethene, and trifluoromethane.

24. The method according to claim 23, wherein said multihologenated organic compound is trifluoromethane and the method includes the further step of adding a secondary gas.

25. The method according to claim 24, wherein the secondary gas is an inert buffer gas.

26. The method according to claim 23, wherein said multihalogenated organic compound is difluoromethane and the method includes the further step of adding a secondary gas.

27. The method according to claim 26, wherein the secondary gas is an inert buffer gas.

28. The method according to claim 1, wherein the step of providing a gas phase source of deuterium occurs at a pressure of about 100 Torr and wherein the step of subjecting said multihalogenated organic compound to infrared radiation occurs at a pulse duration of about one nanosecond.

* * * * *